M. A. RICHARDSON.
RAIL JOINT.
APPLICATION FILED FEB. 25, 1916.

1,208,008.

Patented Dec. 12, 1916.
2 SHEETS—SHEET 1.

Witnesses
Frederick W. Ely
J. W. Garner

Inventor
Morrell A. Richardson.
By Victor J. Evans
Attorney

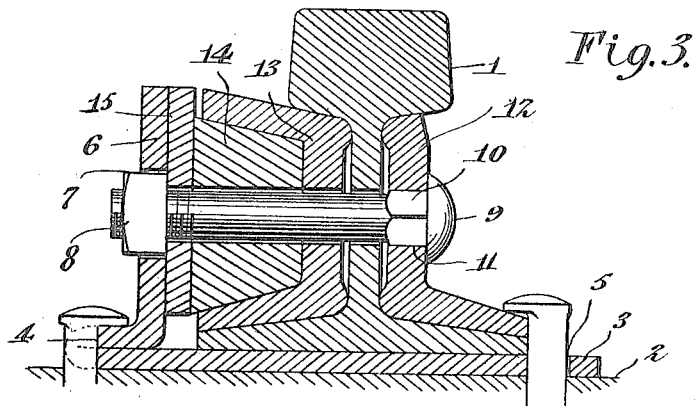
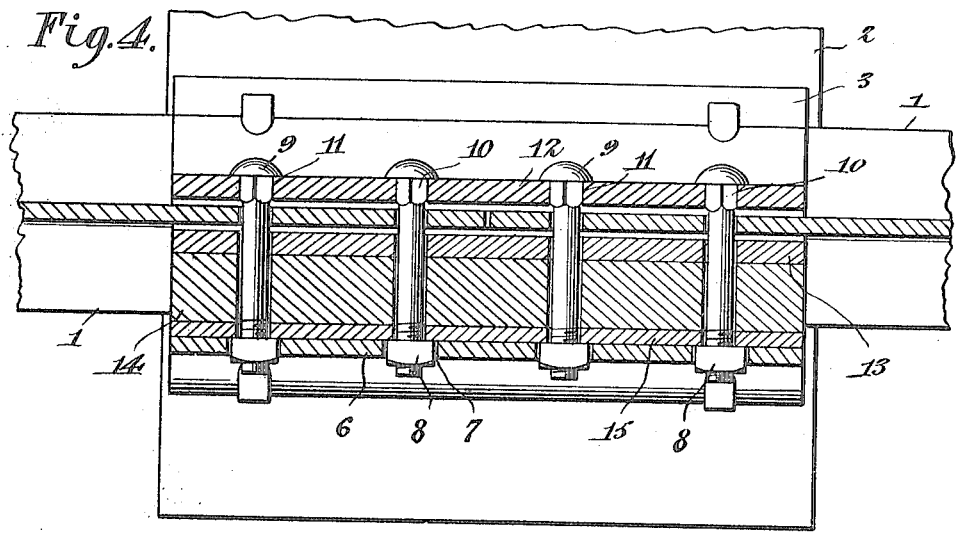
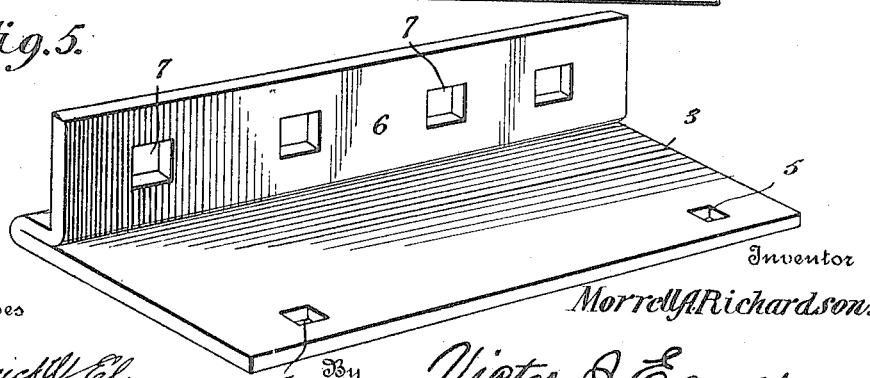

UNITED STATES PATENT OFFICE.

MORRELL A. RICHARDSON, OF INDIANOLA, MISSISSIPPI.

RAIL-JOINT.

1,208,008.

Specification of Letters Patent.

Patented Dec. 12, 1916.

Application filed February 25, 1916. Serial No. 80,546.

*To all whom it may concern:*

Be it known that I, MORRELL A. RICHARDSON, a citizen of the United States, residing at Indianola, in the county of Sunflower and State of Mississippi, have invented new and useful Improvements in Rail-Joints, of which the following is a specification.

This invention relates to improvements in rail joints and nut locks therefor to prevent the possibility of the nuts working loose on the bolts used in securing the rails together at the joints, the object of the invention being to provide improved devices of this character which are cheap and simple, are very strong and durable and which may be readily assembled and disassembled.

The invention consists in the construction, combination and arrangement of devices hereinafter described and claimed.

Figure 1:
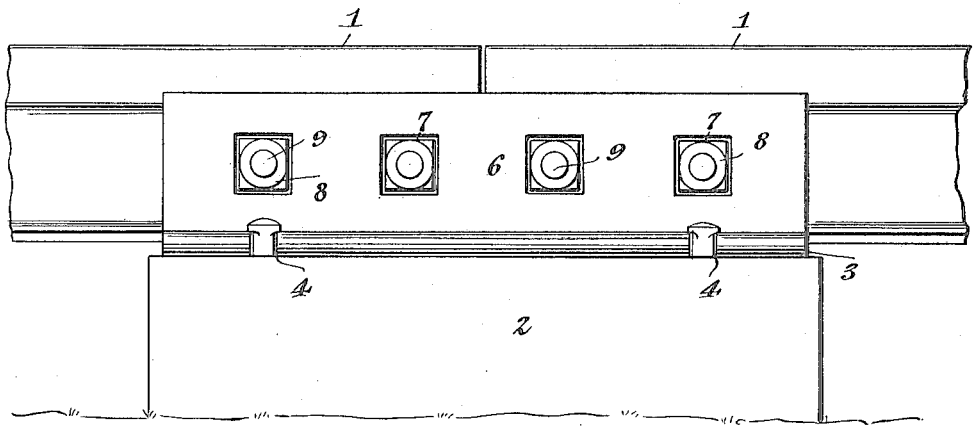
Figure 2:
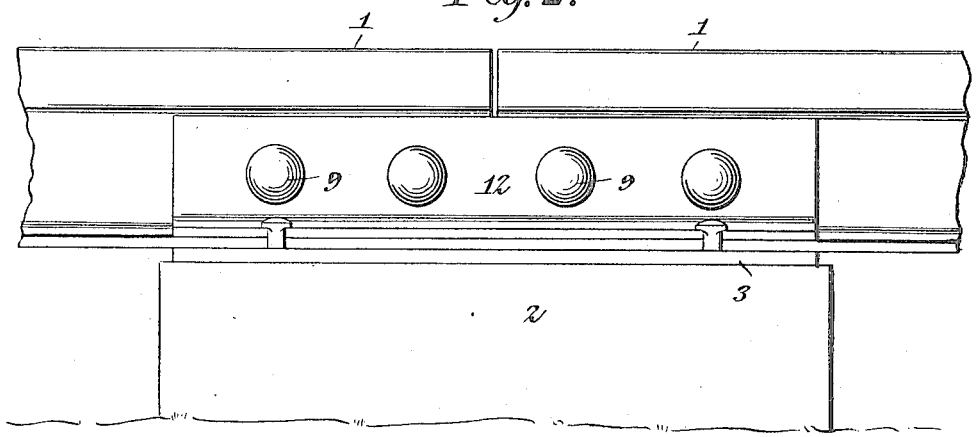

In the accompanying drawings:—Figure 1 is a side elevation of a rail joint and nut locking device constructed in accordance with my invention. Fig. 2 is a similar view showing the opposite side of the rail joint from that shown in Fig. 1. Fig. 3 is a vertical transverse sectional view of the same. Fig. 4 is a horizontal sectional view of the same. Fig. 5 is a detail perspective view of the base plate.

For the purposes of this specification the meeting ends of a pair of railway rails are indicated at 1 and a tie on which the rail ends rest is indicated at 2. In accordance with my invention I provide a base plate 3 which is arranged on the tie, under the meeting ends of the rails, which is provided on the outer side with notches 4 for securing spikes and is provided at a suitable distance from the inner side with openings 5 also to receive securing spikes. The plate is formed, near the outer side, with an upstanding vertical flange 6 which is provided with openings 7 which correspond in shape with the nuts 8 of the bolts 9 and serve to receive the nuts to prevent them from working loose on the bolts.

The squared shanks 10 of the bolts are fitted in correspondingly shaped openings 11 in a channel plate 12 which is arranged on the inner side of the rails, said plate serving to prevent the bolts from turning and also serving as a fish plate. On the opposite side of the rails is an outer channel and fish plate 13 having openings through which the shanks of the bolt extend. A cushioning bar 14 is fitted in the outer channel plate and is preferably made of wood or other like material. The shanks of the bolts pass through openings in the cushioning bar and also through openings in a wear plate 15 which is on the outer side of the cushioning bar and bears against the vertical flange of the base plate. The wear plate prevents the nuts from wearing the cushioning bar. The cushioning bar by its expansive action affords resilience to the rail, thereby cushioning the same to a very considerable extent against shocks and hence adding greatly to the strength and durability of the joint.

While I have herein shown and described a preferred form of my invention I would have it understood that changes may be made in the form, proportion and construction of the several parts without departing from the spirit of the invention and within the scope of the appended claim.

Having thus described my invention, I claim:—

The herein described rail joint comprising in combination with the meeting ends of a pair of rails, a base plate on which the rail ends rest, said base plate being provided at one side with an upstanding flange having openings, fish plates on opposite sides of the rails, the plate on the side adjacent the upstanding flange being provided with a channel in its outer side, a cushioning bar arranged in said channel, a wear plate between said cushioning bar and said upstanding flange, and bolts passing through the fish plates, rails, cushioning bar, and wear plate and having nuts bearing against the outer side of the wear plate and arranged in said openings of said upstanding flange.

In testimony whereof I affix my signature in presence of two witnesses.

MORRELL A. RICHARDSON.

Witnesses:
   A. C. Cox,
   J. A. RICHARDSON.

Copies of this patent may be obtained for five cents each, by addressing the "Commissioner of Patents, Washington, D. C."